(12) United States Patent
Chaudhry

(10) Patent No.: US 10,738,736 B2
(45) Date of Patent: Aug. 11, 2020

(54) FAN VARIABLE AREA NOZZLE WITH CABLE ACTUATOR SYSTEM

(71) Applicant: United Technologies Corporation, Hartford, CT (US)

(72) Inventor: Zaffir A. Chaudhry, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1536 days.

(21) Appl. No.: 14/315,396

(22) Filed: Jun. 26, 2014

(65) Prior Publication Data

US 2014/0305097 A1 Oct. 16, 2014

Related U.S. Application Data

(63) Continuation of application No. 12/441,562, filed as application No. PCT/US2006/039049 on Oct. 12, 2006, now Pat. No. 8,800,260.

(51) Int. Cl.
   *F02K 1/12* (2006.01)
   *F02K 1/15* (2006.01)
   *F02K 3/06* (2006.01)

(52) U.S. Cl.
   CPC .............. *F02K 1/1207* (2013.01); *F02K 1/15* (2013.01); *F02K 3/06* (2013.01); *Y02T 50/671* (2013.01)

(58) Field of Classification Search
   CPC .............. F02K 1/15; F02K 1/1207; F02K 3/06
   See application file for complete search history.

(56) References Cited

U.S. PATENT DOCUMENTS

| | | |
|---|---|---|
| 2,408,761 A | 10/1946 | Dunlop et al. |
| 2,515,274 A | 7/1950 | Stevenson |
| 2,603,062 A | 7/1952 | Weiler |
| 2,634,578 A | 4/1953 | Kallal |
| 2,682,649 A | 6/1954 | Blonder |
| 3,007,304 A | 6/1958 | Wotton et al. |
| 3,138,904 A | 6/1964 | Burford |
| 3,575,061 A | 4/1971 | Howes |

(Continued)

FOREIGN PATENT DOCUMENTS

| | | |
|---|---|---|
| GB | 675624 | 7/1952 |
| GB | 680453 | 10/1952 |

OTHER PUBLICATIONS

Search Report and Written Opinion dated Jun. 6, 2007 for PCT/US2006/039049.

(Continued)

*Primary Examiner* — Lorne E Meade
(74) *Attorney, Agent, or Firm* — Carlson, Gaskey & Olds, P.C.

(57) ABSTRACT

An assembly for pivoting a flap according to an exemplary aspect of the present disclosure includes, among other things, a structure is mounted at least partially around an axis. The structure is attached to a pivotable flap arranged to define a nozzle area. A cable passes through an orifice defined by the flap. An actuator system is operable to mechanically retract the cable therein to lessen the nozzle area and mechanically extend the cable to enable the flow to increase the nozzle area. The actuator system is engaged with the cable. A segment of the cable, opposite the actuator system, is attached to a fixed structure. A method of providing a variable fan exit area is also disclosed.

21 Claims, 5 Drawing Sheets

(56) References Cited

U.S. PATENT DOCUMENTS

| | | | |
|---|---|---|---|
| 4,059,018 A | 11/1977 | Reick | |
| 4,112,677 A | 9/1978 | Kasmarik | |
| 4,242,864 A | 1/1981 | Cornett et al. | |
| 4,251,987 A | 2/1981 | Adamson | |
| 4,616,553 A | 10/1986 | Nixon | |
| 4,760,964 A | 8/1988 | Burandt | |
| 4,825,754 A | 5/1989 | Devaud et al. | |
| 4,850,535 A | 7/1989 | Ivie | |
| 5,002,328 A | 3/1991 | Michel | |
| 5,010,729 A | 4/1991 | Adamson et al. | |
| 5,110,069 A | 5/1992 | Webb | |
| 5,295,645 A | 3/1994 | Rozmus | |
| 5,782,431 A | 7/1998 | Gal-Or et al. | |
| 5,829,464 A | 11/1998 | Aalto et al. | |
| 6,318,070 B1 | 11/2001 | Rey et al. | |
| 6,543,224 B1 | 5/2003 | Barooah | |
| 7,104,053 B2 | 9/2006 | Gast | |
| 7,458,221 B1 | 12/2008 | Arnold et al. | |
| 2002/0125340 A1 | 9/2002 | Birch et al. | |
| 2004/0154283 A1 | 8/2004 | Rey et al. | |

OTHER PUBLICATIONS

Final Written Decision. U.S. Pat. No. 8,313,280. *General Electric Company*, Petitioner, v. *United Technologies Corporation*, Patent Owner. IPR2017-00427. Entered Jul. 3, 2018.

FAN VARIABLE AREA NOZZLE WITH CABLE ACTUATOR SYSTEM

This application is a continuation of U.S. patent application Ser. No. 12/441,562, filed Mar. 17, 2009, now U.S. Pat. No. 8,800,260, which is a National Phase Application of PCT Application No. PCT/US06/39049 filed on Oct. 12, 2006.

BACKGROUND

The present invention relates to a gas turbine engine, and more particularly to a turbofan gas turbine engine having a cable driven fan variable area nozzle structure within the fan nacelle thereof.

Conventional gas turbine engines include a fan section and a core engine with the fan section having a larger outer diameter than that of the core engine. The fan section and the core engine are disposed sequentially about a longitudinal axis and are enclosed in a nacelle. An annular path of primary airflow passes through the fan section and the core engine to generate primary thrust.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases is discharged through the core exhaust nozzle.

The fan nozzles of conventional gas turbine engines have fixed geometry. The fixed geometry fan nozzles are suitable for take-off and landing conditions as well as for cruise conditions. However, the requirements for take-off and landing conditions are different from requirements for the cruise condition. Optimum performance of the engine may be achieved during different flight conditions of an aircraft by varying the fan exhaust nozzle for the specific flight regimes.

Some gas turbine engines have implemented fan variable area nozzles. The fan variable area nozzle provides a smaller fan exit nozzle diameter during cruise conditions and a larger fan exit nozzle diameter during take-off and landing conditions. The existing variable area nozzles typically utilize relatively complex mechanisms that increase engine weight to the extent that the increased fuel efficiency benefits gained from fan variable area nozzle are negated.

Accordingly, it is desirable to provide an effective, lightweight fan variable area nozzle for a gas turbine engine.

SUMMARY

A nacelle assembly for a gas turbine engine according to an example of the present disclosure includes a core nacelle defined about an axis for allowing flow to pass therethrough. A fan nacelle is mounted at least partially around the core nacelle. The fan nacelle has a fan variable area nozzle that defines a fan exit area between the fan nacelle and the core nacelle. The nozzle has a plurality of pivotable flaps pivotable about a pivot defined by each of the flaps. A cable passes through an orifice defined by at least one of the flaps. An actuator system is operable to mechanically retract the cable therein pivoting at least one of the flaps about the pivot to lessen the fan exit area and mechanically extend the cable to enable the flow to pivot at least one of the flaps about the pivot and increase the fan exit area. The actuator system is engaged with the cable. A segment of the cable, opposite the actuator system, is attached to a fixed structure.

In a further embodiment of any of the foregoing embodiments, there is one actuator system for the plurality of flaps.

In a further embodiment of any of the foregoing embodiments, the actuator system includes a spool configured to spool and unspool the cable.

In a further embodiment of any of the foregoing embodiments, spooling of the cable around the spool decreases the fan nozzle exit area.

In a further embodiment of any of the foregoing embodiments, unspooling of the cable around the spool increases the fan nozzle exit area.

In a further embodiment of any of the foregoing embodiments, the cable is strung through one of the plurality of flaps intermediate a first fixed structure of the fan nacelle and a second fixed structure of the fan nacelle.

In a further embodiment of any of the foregoing embodiments, the first fixed structure of the fan nacelle and the second fixed structure of the fan nacelle include a rib of the fan nacelle.

In a further embodiment of any of the foregoing embodiments, the fan variable area nozzle includes a multiple of flap sets. Each of the flap sets is separately driven by a respective cable and actuator of the actuator system to adjust the fan variable area nozzle.

In a further embodiment of any of the foregoing embodiments, each flap set corresponds to a circumferential sector of the fan variable area nozzle.

In a further embodiment of any of the foregoing embodiments, there are four circumferential sectors.

In a further embodiment of any of the foregoing embodiments, a gear system is driven by a core engine. A fan is driven by the gear system about the axis.

In a further embodiment of any of the foregoing embodiments, the actuator system includes an electromechanical actuator.

In a further embodiment of any of the foregoing embodiments, the actuator system comprises a rotary hydraulic actuator.

An assembly for pivoting a flap, the assembly disposed about an axis along which a flow passes from an upstream direction to a downstream direction, the assembly including a structure mounted at least partially around the axis. The structure is attached to a pivotable flap arranged to define a nozzle area. The pivotable flap is pivotable about a pivot at the structure. A cable is engaged with a first fixed engagement point of the structure, the cable passing through an orifice defined by the flap. An actuator system is operable to mechanically retract the cable therein to lessen the nozzle area and mechanically extend the cable to enable the flow to urge the flap to increase the nozzle area. The actuator system is engaged with the cable. A segment of the cable, opposite the actuator system, is attached to a fixed structure.

In a further embodiment of any of the foregoing embodiments, the actuator system includes a spool engaged with the cable.

In a further embodiment of any of the foregoing embodiments, the cable is strung through the orifice intermediate the first fixed engagement point and a second fixed engagement point of the structure.

A method of providing a variable fan exit area of a high-bypass gas turbine engine includes the steps of locating a fan variable area nozzle to define a fan nozzle exit area between a fan nacelle and a core nacelle, and disposing a cable through at least one nacelle engagement point of the fan nacelle and through at least one flap engagement point of the fan variable area nozzle. The method includes the steps of providing an actuator system that engages with the cable, and activating or deactivating the cable engaged with the fan variable area nozzle to vary the fan nozzle exit area to adjust fan bypass airflow. Deactivating the cable extends the cable to enable the flow to urge the flaps to increase the area.

In a further embodiment of any of the foregoing embodiments, the step of disposing a cable includes activating the cable to converge the fan nozzle exit area during cruise flight condition.

In a further embodiment of any of the foregoing embodiments, the step of disposing a cable includes engaging a first end of the cable at a spool and a second end of the cable at the fixed attachment point. The cable between the first and second ends is received in an orifice defined at the flap engagement point.

In a further embodiment of any of the foregoing embodiments, the actuator system is a rotary hydraulic actuator.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1A:
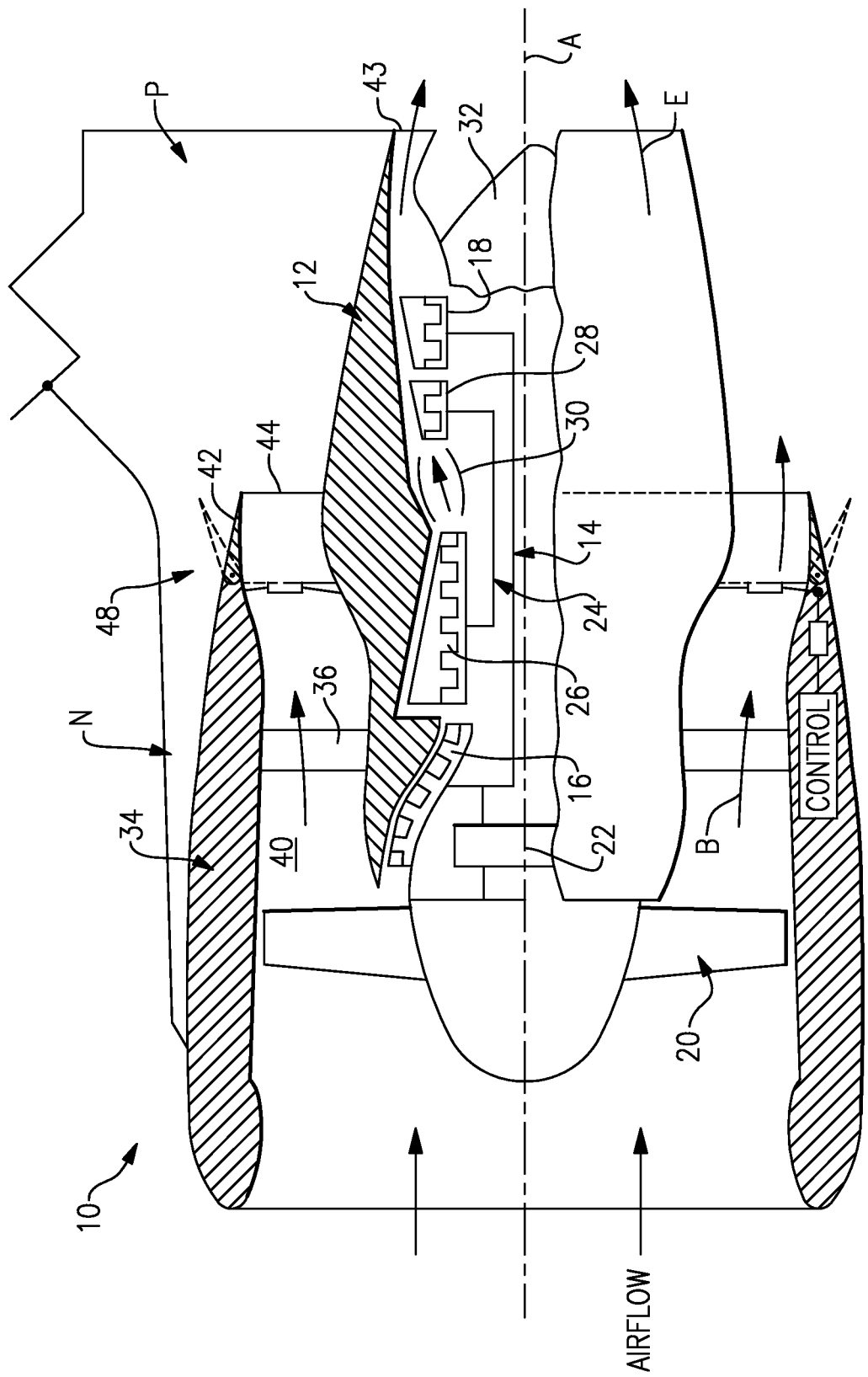
FIG. 1A is a general perspective view an exemplary turbo fan engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 connected to the low spool 14 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the fan diameter is significantly larger than that of the low pressure compressor 16, and the low pressure turbine 18 has a pressure ratio that is greater than 5. The gear train 22 is preferably an epicyclic gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through the gear train 22. A core engine exhaust E exits the core nacelle 12 through a core nozzle 43 defined between the core nacelle 12 and a tail cone 32.

Figure 1B:
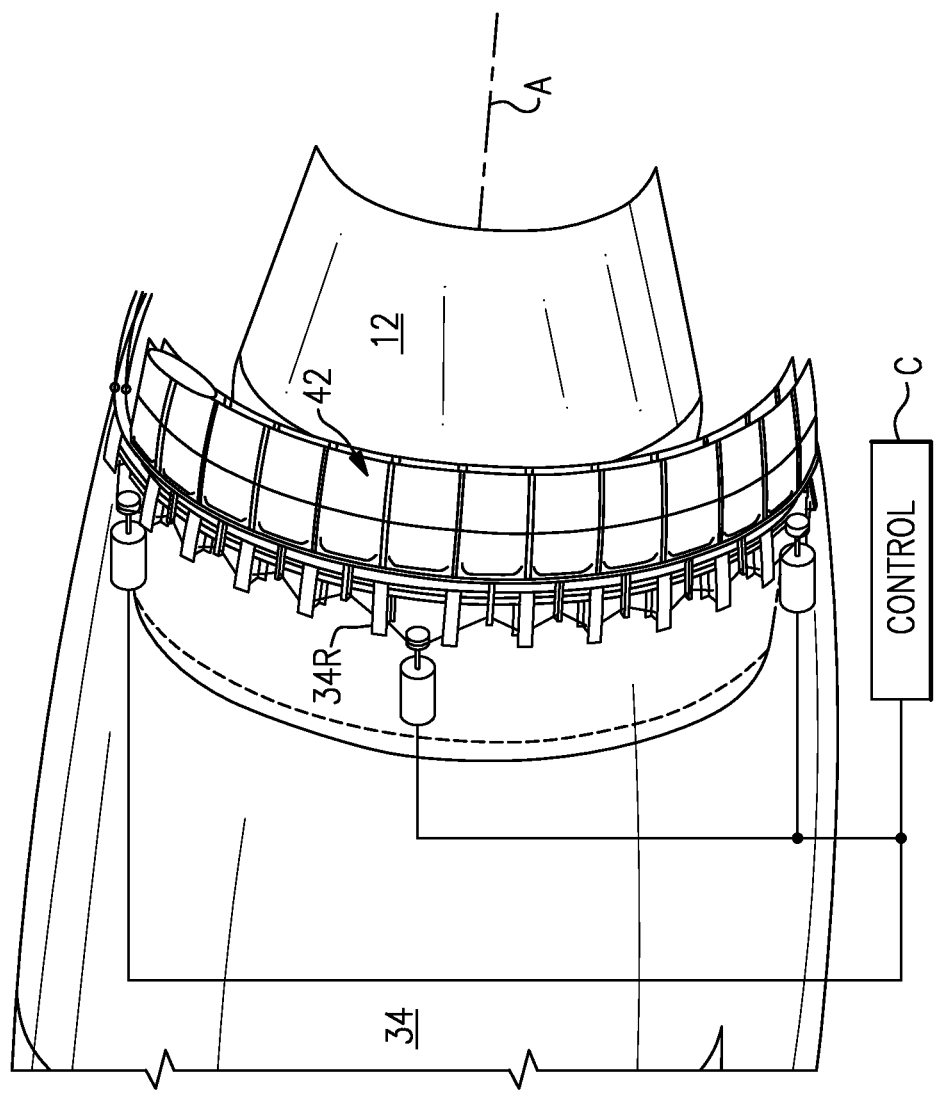
FIG. 1B is a perspective partial fragmentary view of the engine.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which over 80 percent of the airflow entering the fan nacelle 34 becomes bypass flow B. The bypass flow B communicates through the generally annular bypass flow path 40 and is discharged from the engine 10 through a fan variable area nozzle (FVAN) 42 (also illustrated in FIG. 1B) which varies an effective fan nozzle exit area 44 between the fan nacelle 34 and the core nacelle 12.

Thrust is a function of density, velocity, and area. One or more of these parameters can be manipulated to vary the amount and direction of thrust provided by the bypass flow B. The FVAN 42 changes the physical area and geometry to manipulate the thrust provided by the bypass flow B. However, it should be understood that the fan nozzle exit area 44 may be effectively altered by methods other than structural changes. Furthermore, it should be understood that effectively altering the fan nozzle exit area 44 need not be limited to physical locations approximate the end of the fan nacelle 34, but rather, may include the alteration of the bypass flow B at other locations.

The FVAN 42 defines the fan nozzle exit area 44 for discharging axially the fan bypass flow B pressurized by the upstream fan section 20 of the turbofan engine. A significant amount of thrust is provided by the bypass flow B due to the high bypass ratio. The fan section 20 of the engine 10 is preferably designed for a particular flight condition—typically cruise at 0.8 M and 35,000 feet. The fan section 20 includes fan blades which are designed at a particular fixed stagger angle for an efficient cruise condition. The FVAN 42 is operated to vary the fan nozzle exit area 44 to adjust fan bypass air flow such that the angle of attack or incidence on the fan blades are maintained close to design incidence at other flight conditions such as landing and takeoff, thus enabling optimized engine operation over a range of flight condition with respect to performance and other operational parameters such as noise levels. Preferably, the FVAN 42 defines a nominal converged position for the fan nozzle exit area 44 at cruise and climb conditions, but radially opens relative thereto to define a diverged position for other flight conditions. The FVAN 42 preferably provides an approximately 20% (twenty percent) change in the fan nozzle exit area 44. It should be understood that other arrangements as well as essentially infinite intermediate positions as well as thrust vectored positions in which some circumferential sectors of the FVAN 42 are converged relative to other diverged circumferential sectors are likewise usable with the present invention.

Figure 1C:
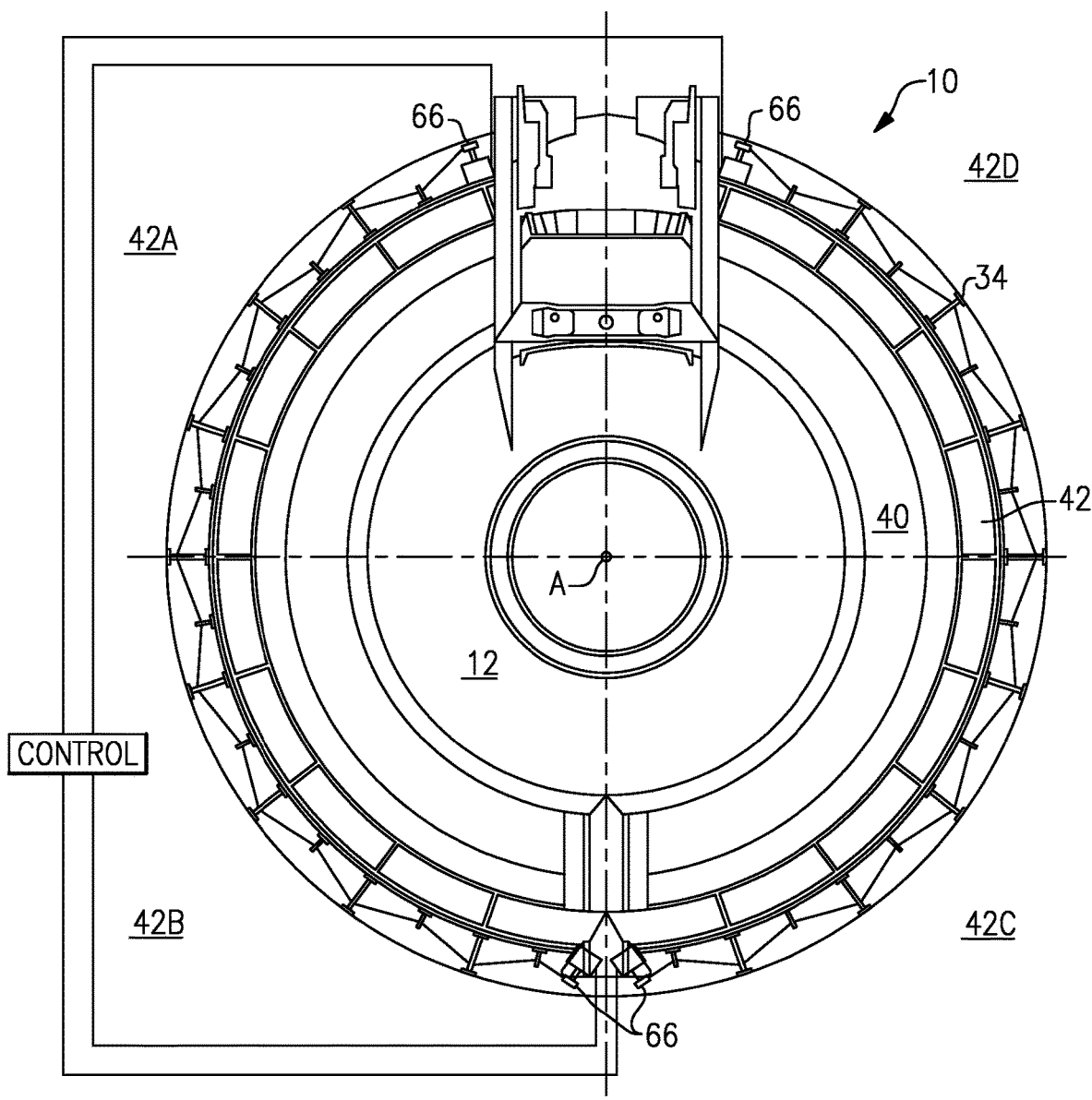
FIG. 1C is a rear view of the engine.

The FVAN 42 is preferably separated into at least four sectors 42A-42D (FIG. 1C) which are each independently adjustable to asymmetrically vary the fan nozzle exit area 44 to generate vectored thrust. It should be understood that although four sectors are illustrated, any number of sectors may alternatively be provided.

In operation, the FVAN 42 communicates with a controller C or the like to adjust the fan nozzle exit area 44 in a symmetrical and asymmetrical manner. Other control systems including an engine controller or aircraft flight control system may also be usable with the present invention. By adjusting the entire periphery of the FVAN 42 symmetrically in which all sectors are moved uniformly, thrust efficiency and fuel economy are maximized during each flight condition. By separately adjusting the circumferential sectors 42A-42D of the FVAN 42 to provide an asymmetrical fan nozzle exit area 44, engine bypass flow is selectively vectored to provide, for example only, trim balance, thrust-controlled maneuvering, enhanced ground operations and short field performance.

Figure 2A:
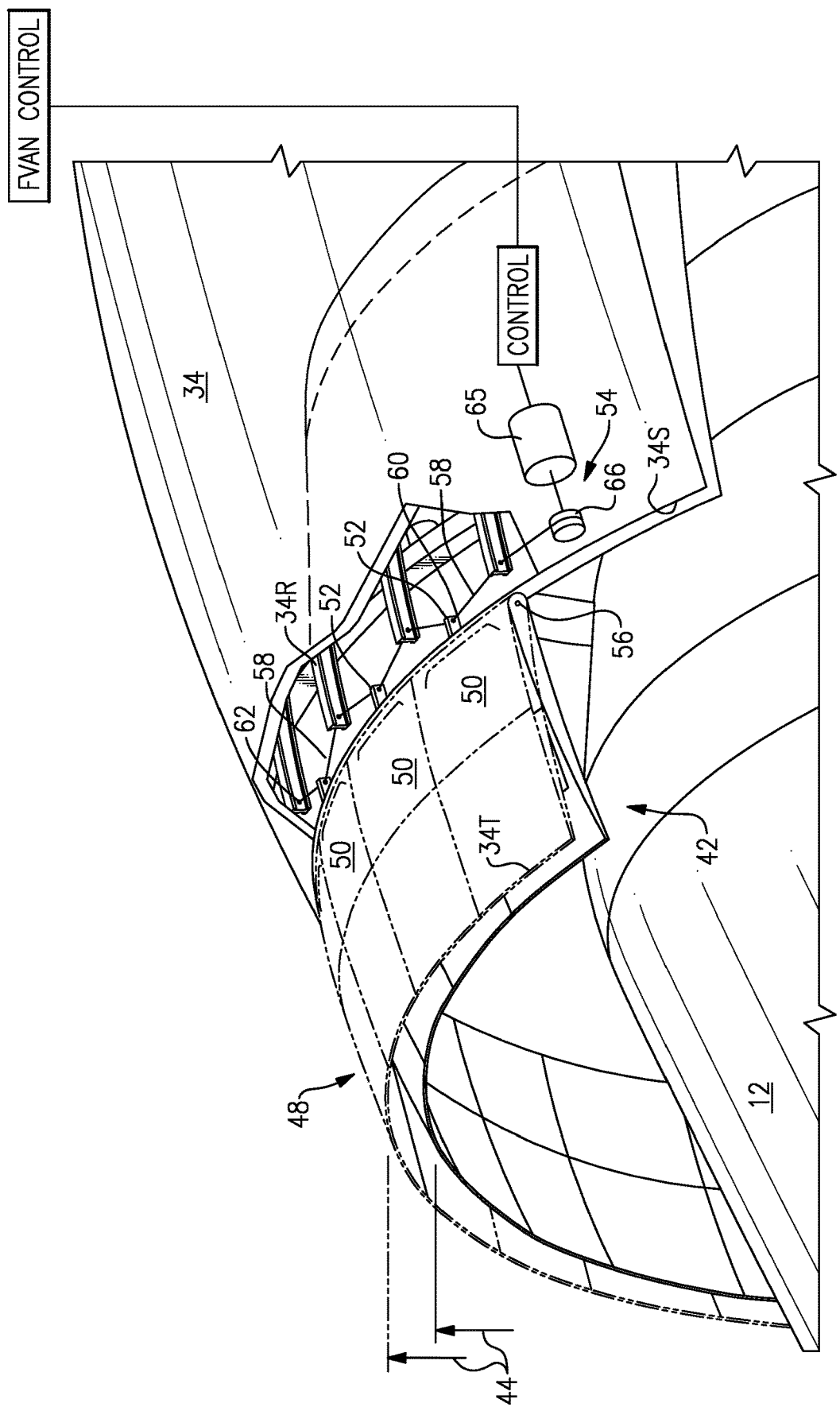
FIG. 2A is a perspective partial phantom view of a section of the FVAN.

Referring to FIG. 2A, the FVAN 42 generally includes a flap assembly 48 which define the fan nozzle exit area 44. The flaps 48 are preferably incorporated into the end segment 34S of the fan nacelle 34 to define a trailing edge 34T thereof. The flap assembly 48 generally includes a multiple of flaps 50, each with a respective linkage system 52 and an actuator system 54.

Figure 2B:
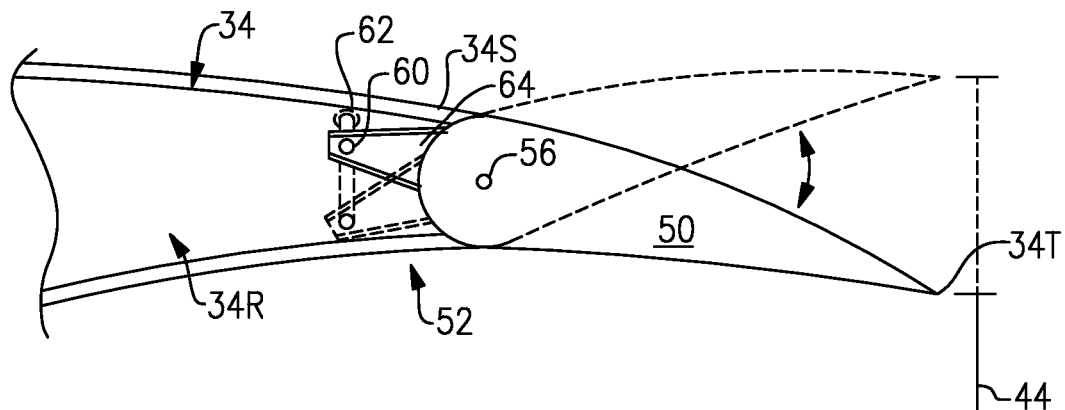
FIG. 2B is an expanded view of one flap assembly of the FVAN.

Each flap 50 defines a pitch point 56 about which the flap 50 pivots relative the fan nacelle 34 (best illustrated in FIG. 2B). Forward of the pitch point 56 relative the trailing edge 34T, the linkage system 52 preferably engages the flap 50. It should be understood that other locations may likewise be usable with the present invention.

The linkage system 52 preferably includes a cable 58 which circumscribes the fan nacelle 34. The cable 58 engages each flap 50 at a flap engagement point 60 and a multiple of fixed fan nacelle structures 34R such as fan nacelle ribs or such like at a fixed engagement point 62. The flap engagement point 60 is preferably located within a flap extension 64 (FIG. 2B) which extends forward of the pivot point 56 relative the trailing edge 34T and is preferably contained within the fan nacelle 34. It should be understood that various flap extensions 64 and the like may be utilized within the flap linkage 52 to receive the cable 58 and that only a simplified kinematics representation is illustrated in the disclosed embodiment.

Figure 2C:
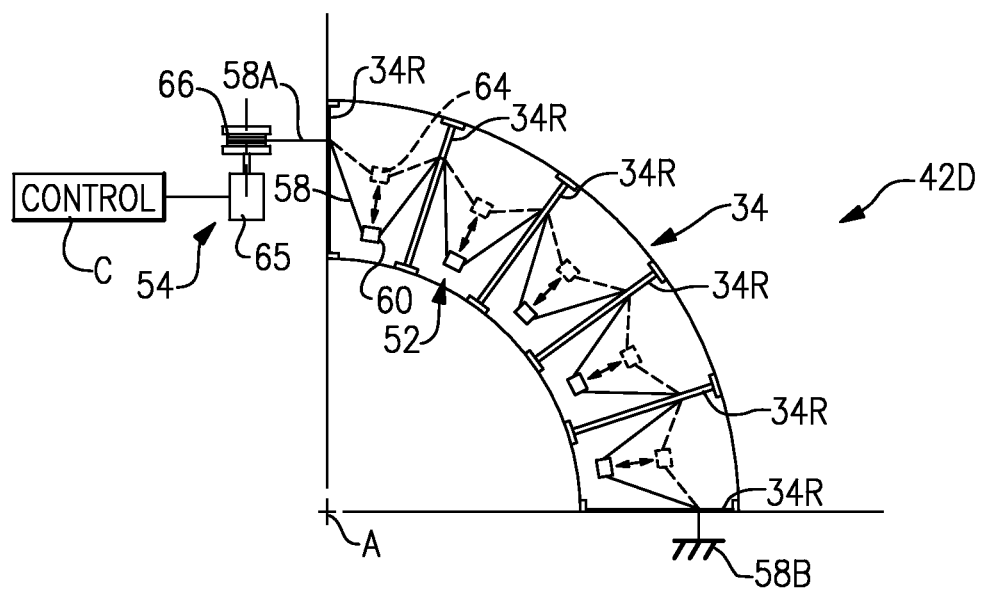
FIG. 2C is a partial phantom view of a section of the FVAN.

The cable 58 is preferably strung within the fan nacelle 34 to pass through one fixed engagement point 62, the flap engagement point 60 and a second fixed engagement point 62 (FIG. 2C). That is, the flap engagement point 60 is intermediate the fixed engagement points 62. The fixed engagement point 62 and the flap engagement point 60 are generally eyelets or like which permit the cable to be strung therethrough. The eyelets may include roller, bushing, or bearing structures which minimizes friction applied to the cable 58 at each point 60, 62. Preferably, the cable 58 is strung through a multiple of flaps 50 to define a flap set of each circumferential sectors 42A-42D of the FVAN 42. That is, a separate cable 58 is utilized within each circumferential sector 42A-42D such that each cable 58 is individually driven by the actuator system 54 to asymmetrically adjust the FVAN 42.

Preferably, the actuator system includes a compact high power density electromechanical actuator (EMA) 65 or a rotary hydraulic actuator which rotates a spool 66 connected thereto. Alternatively, a linear actuator may be also utilized to directly pull the cable 58 to change the effective length thereof. That is, the cable 58 is pulled transverse to the length thereof such that the overall length is essentially "spooled" and "unspooled." It should be understood that a cable-driven system inherently facilitates location of the actuator 65 relatively remotely from the multiple of flaps 50 through various pulley systems and the like. It should be understood that various actuator systems which deploys and retract the cable will be usable with the present invention.

Referring to FIG. 2C, the actuator system 54 engages an end segment 58A of the cable 58 such that the cable 58 may be spooled and unspooled to increase or decrease the length thereof. The cable 58 is wound around a spool 66 at one end segment 58A while the other end segment 58B is attached to a fixed attachment such as one of the fixed structure 34R. By spooling the cable 58 around the spool 66, the effective circumferential length of the cable 58 is effectively decreased (shown in phantom) such that the fan nozzle exit area 44 is decreased. By unspooling the cable 58 from the spool 66, the effective circumferential length of the cable 58 is effectively increased (shown solid) such that the fan nozzle exit area 44 is increased. The bypass flow B permits unilateral operation of the FVAN such that the bypass flow B diverges the flaps 50 and the FVAN 42 need only be driven (cable 58 retracted) to overcome the bypass flow B pressure which results in a significant weight savings. This advantage of the present invention allows practical use of the variable area nozzle on the gas turbine engines.

Whereas the diverged shape is utilized for landing and takeoff flight conditions, should the cable 58 break, the FVAN 42 will failsafe to the diverged shape. It should be understood, however, that positive return mechanisms may alternatively or additionally be utilized.

Each cable 58 preferably pitches one flap set between the converged position (shown in phantom) and a diverged position. It should be understood that although four sectors are illustrated (FIG. 1C), any number of sectors may alternatively or additionally be provided. It should be further understood that any number of flaps 50 may be controlled by a single cable 58 such that, for example only, the single cable may be strung around the entire circumference of the fan nacelle 34, however, a sector arrangement is preferred to provide asymmetric capability to the FVAN 42.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A nacelle assembly for a gas turbine engine comprising:
a core nacelle defined about an axis for allowing core flow to pass therethrough;
a fan nacelle mounted at least partially around said core nacelle, said fan nacelle having a fan variable area nozzle that defines a fan exit area between said fan nacelle and said core nacelle, said nozzle having a plurality of pivotable flaps pivotable about a pivot defined by each one of said plurality of pivotable flaps;

a cable passing through an orifice defined by at least one of said plurality of pivotable flaps; and an actuator system operable to mechanically retract said cable therein pivoting at least one of said flaps about said pivot to lessen said fan exit area and mechanically extend said cable to enable bypass flow to pivot at least one of said flaps about said pivot and increase said fan exit area, wherein said actuator system is engaged with said cable, and a segment of said cable, opposite said actuator system, is attached to a fixed structure of the fan nacelle.

2. The nacelle assembly as recited in claim 1, wherein there is one actuator system for said plurality of flaps.

3. The nacelle assembly as recited in claim 1, wherein said actuator system includes a spool configured to spool and unspool said cable.

4. The nacelle assembly of claim 3, wherein spooling of said cable around said spool decreases the fan nozzle exit area.

5. The nacelle assembly of claim 3, wherein unspooling of said cable around said spool increases the fan nozzle exit area.

6. The nacelle assembly of claim 5, wherein said cable includes a first end and a second end, said first end engaged with said spool, second end of the cable attached to a fixed attachment point of said fan nacelle, and said cable is strung through one of said plurality of flaps intermediate a first fixed structure of said fan nacelle and a second fixed structure of said fan nacelle.

7. The nacelle assembly as recited in claim 1, wherein said cable is strung through one of said plurality of flaps intermediate a first fixed structure of said fan nacelle and a second fixed structure of said fan nacelle.

8. The nacelle assembly as recited in claim 7, wherein said first fixed structure of said fan nacelle and said second fixed structure of said fan nacelle include a rib of said fan nacelle.

9. The nacelle assembly as recited in claim 1, wherein said fan variable area nozzle includes a multiple of flap sets, each of said flap sets separately driven by a respective cable and actuator of said actuator system to adjust said fan variable area nozzle.

10. The nacelle assembly as recited in claim 9, wherein each flap set corresponds to a circumferential sector of the fan variable area nozzle.

11. The nacelle assembly as recited in claim 10, wherein there are four circumferential sectors.

12. The nacelle assembly as recited in claim 1, further comprising:
a gear system driven by a core engine; and
a fan driven by said gear system about said axis.

13. The nacelle assembly as recited in claim 1, wherein the actuator system includes an electromechanical actuator.

14. The nacelle assembly as recited in claim 1, wherein the actuator system comprises a rotary hydraulic actuator.

15. An assembly for pivoting a pivotable flap, said assembly disposed about an axis along which a flow passes from an upstream direction to a downstream direction, said assembly comprising:

a structure mounted at least partially around said axis, said structure attached to a pivotable flap arranged to define a nozzle area, said pivotable flap being pivotable about a pivot at said structure;

a cable including a first end and a second end, and said second end engaged with a first fixed engagement point of said structure, said cable passing through an orifice defined by said pivotable; and an actuator system operable to mechanically retract said cable therein to lessen the nozzle area and mechanically extend said cable to enable said flow to urge said pivotable flap to increase said nozzle area, wherein said actuator system includes a spool engaged with said first end of said cable, and a segment of said cable, opposite said actuator system, is attached to a fixed structure.

16. The assembly as recited in claim 15, wherein said cable is strung through said orifice intermediate said first fixed engagement point and a second fixed engagement point of said structure.

17. A method of providing a variable fan exit area of a high-bypass gas turbine engine comprising the steps of:
(A) locating a fan variable area nozzle to define a fan nozzle exit area between a fan nacelle and a core nacelle;
(B) disposing a cable through at least one nacelle engagement point of said fan nacelle and through at least one flap engagement point of said fan variable area nozzle, engaging a first end of the cable at a spool, and attaching a second end of the cable to a fixed attachment point of said fan nacelle;
(C) providing an actuator system that engages with said cable; and
(D) activating or deactivating the cable engaged with said fan variable area nozzle to vary the fan nozzle exit area to adjust fan bypass airflow, wherein deactivating said cable extends the cable to enable said flow to urge a plurality of pivotable flaps of said fan variable arrow nozzle to increase said area.

18. A method as recited in claim 17, wherein said step (D) further comprises:
(a) activating the cable to converge the fan nozzle exit area during cruise flight condition.

19. A method as recited in claim 17, wherein said step (B) further comprises:
(a) wherein said cable between said first and second ends is received in an orifice defined at said flap engagement point.

20. A method as recited in claim 17, wherein the actuator system comprises a rotary hydraulic actuator.

21. The method as recited in claim 17, wherein said plurality of pivotable flaps are arranged about an axis to define said fan nozzle exit area, said fan variable area nozzle located aft of said fan nacelle relative to said axis, each of said plurality of pivotable flaps being pivotable about a corresponding pivot point, and said flap engagement point being located forward of each said pivot point relative to said axis.

* * * * *